(12) United States Patent
Namimatsu et al.

(10) Patent No.: US 8,844,286 B2
(45) Date of Patent: Sep. 30, 2014

(54) AIR CLEANER, AND ENGINE CONTROL SYSTEM

(75) Inventors: Kanji Namimatsu, Oyama (JP); Tomohiro Shimazu, Oyama (JP); Tadashi Iijima, Yuuki (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 743 days.

(21) Appl. No.: 13/057,094

(22) PCT Filed: Jul. 21, 2009

(86) PCT No.: PCT/JP2009/063017
§ 371 (c)(1),
(2), (4) Date: Apr. 27, 2011

(87) PCT Pub. No.: WO2010/013613
PCT Pub. Date: Feb. 4, 2010

(65) Prior Publication Data
US 2011/0219768 A1  Sep. 15, 2011

(30) Foreign Application Priority Data
Aug. 1, 2008  (JP) .................... 2008-199449

(51) Int. Cl.
| | |
|---|---|
| *F02B 33/44* | (2006.01) |
| *B01D 39/00* | (2006.01) |
| *B01D 50/00* | (2006.01) |
| *B01D 46/00* | (2006.01) |
| *F02M 35/02* | (2006.01) |
| *F02D 41/18* | (2006.01) |
| *F02M 35/024* | (2006.01) |
| *B01D 46/24* | (2006.01) |
| *B01D 46/44* | (2006.01) |
| *F02D 41/00* | (2006.01) |
| *F02M 25/07* | (2006.01) |
| *F02B 29/04* | (2006.01) |
| *F02M 35/10* | (2006.01) |

(52) U.S. Cl.
CPC .......... *F02M 35/024* (2013.01); *F02D 41/0007* (2013.01); *F02D 41/18* (2013.01); *F02M 25/0727* (2013.01); *F02B 29/0406* (2013.01); *F02M 25/0707* (2013.01); *F02M 25/0713* (2013.01); *F02M 35/10262* (2013.01); *F02M 35/021* (2013.01); *B01D 46/0024* (2013.01); *B01D 46/2411* (2013.01); *B01D 46/444* (2013.01); *F02D 41/0052* (2013.01)
USPC ............. 60/605.2; 55/498; 55/510; 55/385.3; 55/502; 123/198 E

(58) Field of Classification Search
CPC ......................... F02M 35/021; F02M 35/0214
See application file for complete search history.

(56) References Cited

U.S. PATENT DOCUMENTS 5,029,465 A   7/1991  Tanimura et al.
5,253,517 A   10/1993  Molin et al.
(Continued)

FOREIGN PATENT DOCUMENTS

DE   102010029217 A1 * 11/2011
EP      0 458 998 A1    5/1990
(Continued)

OTHER PUBLICATIONS

The Mesh Company Data Sheet.*
(Continued)

*Primary Examiner* — Thomas Denion
*Assistant Examiner* — Jessica Kebea
(74) *Attorney, Agent, or Firm* — Fish & Richardson P.C.

(57) ABSTRACT

An air cleaner includes a case in which an inner cylindrical filter and an outer cylindrical filter are housed, the case having a case body that defines an opening end surface closed by a cover member. The case includes an air inlet provided to an outer circumference of the case body for supplying outside air and an exhaust outlet provided to a bottom of the case body at a downstream side in an air-flowing direction for discharging the air supplied through the air inlet and filtered through the inner cylindrical filter and the outer cylindrical filter. A mass flow rate sensor is provided in the exhaust outlet to measure the flow rate of the air. A flow straightening grid is provided at the upstream side of the mass flow rate sensor to straighten the flow of the air.

9 Claims, 9 Drawing Sheets

(56) References Cited

U.S. PATENT DOCUMENTS

| | | | |
|---|---|---|---|
| 5,547,480 A | 8/1996 | Coulonvaux | |
| 5,953,920 A * | 9/1999 | Swift et al. | 62/6 |
| 6,835,237 B2 * | 12/2004 | Ishida | 96/135 |
| 7,476,268 B2 * | 1/2009 | Maier et al. | 96/134 |
| 2003/0121263 A1 * | 7/2003 | Hidaka | 60/602 |
| 2004/0003650 A1 | 1/2004 | Strohrmann et al. | |
| 2005/0262818 A1 * | 12/2005 | Stenersen | 55/482 |
| 2006/0162303 A1 | 7/2006 | Gunderson et al. | |
| 2006/0292426 A1 * | 12/2006 | Stenersen et al. | 429/34 |

FOREIGN PATENT DOCUMENTS

| | | | | |
|---|---|---|---|---|
| EP | 0859145 A1 * | 8/1998 | | F02M 35/02 |
| EP | 2169209 A1 * | 3/2010 | | |
| JP | H05-10771 U | 2/1993 | | |
| JP | H09-508850 A | 9/1997 | | |
| JP | H10-48021 A | 2/1998 | | |
| JP | 2001-286715 A | 10/2001 | | |
| JP | 2001-289132 A | 10/2001 | | |
| JP | 2003-315126 A | 11/2003 | | |
| JP | 2008-106636 A | 5/2008 | | |
| KR | 2003-0065458 A | 8/2003 | | |
| WO | WO 2013035602 A1 * | 3/2013 | | |

OTHER PUBLICATIONS

Office Action dated Jul. 23, 2012 from Korean Patent Application No. 2011-7002282, 9 pages.

Diesel-Engine Management, Diesel Engine Reference Book, Second Edition, 1999, 4 pages.

Swedish Office Action issued Nov. 23, 2011 in Swedish Patent Application No. 1150172-3, 11 pages.

International Search Report dated Sep. 15, 2009 from International Application No. PCT/JP2009/063017, 2 pages.

Notice of Allowance dated Jan. 10, 2013 from Korean Application No. 2011-7002282, including English translation, 3 pages.

* cited by examiner

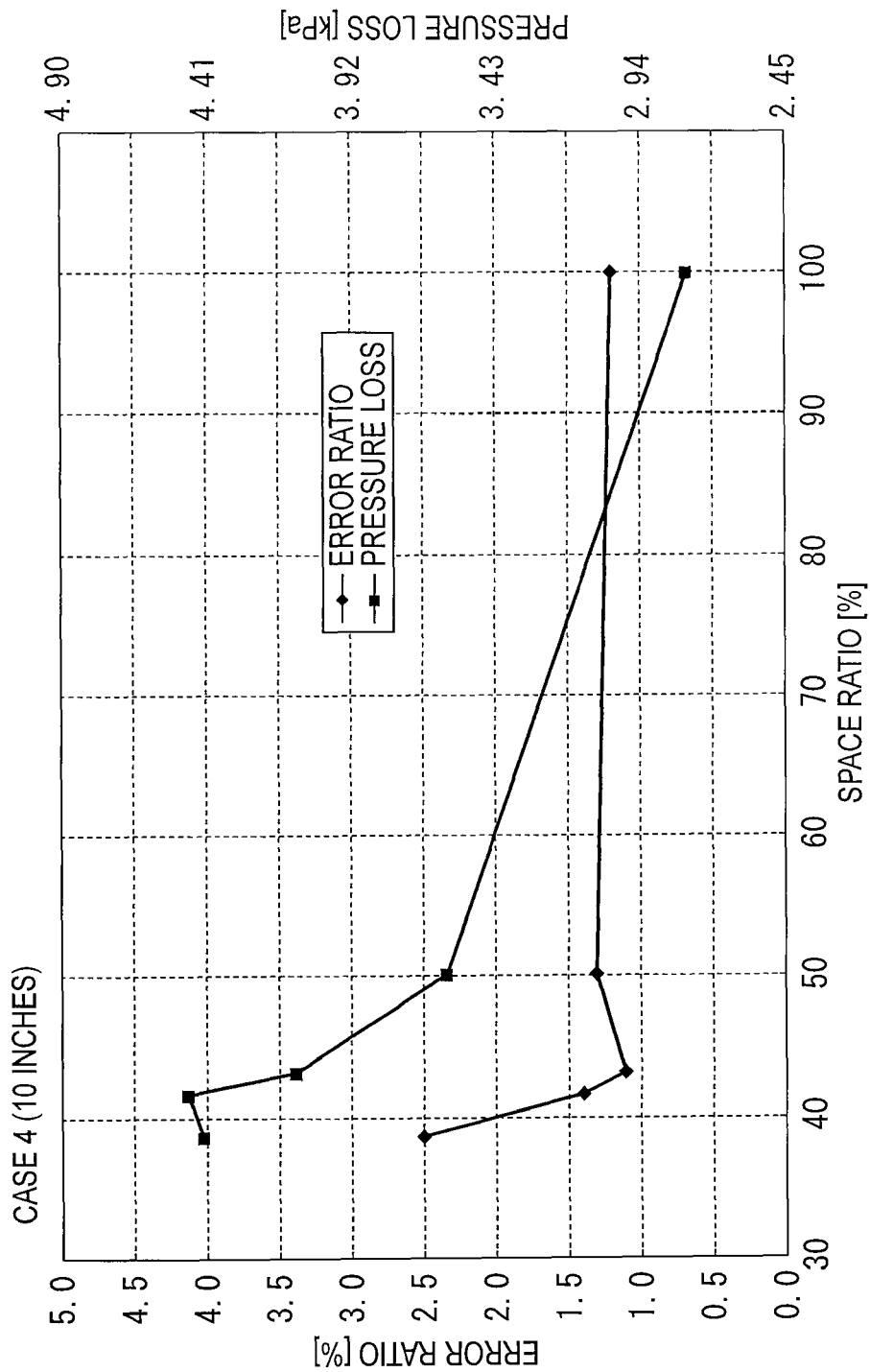

AIR CLEANER, AND ENGINE CONTROL SYSTEM

CROSS REFERENCE TO RELATED APPLICATIONS

This application claims priority to Application No. PCT/JP 2009/063017 filed on Jul. 21, 2009, which application claims priority to Application No. JP 2008-199449 filed on Aug, 1, 2008. The entire contents of both applications are incorporated herein by reference in their entireties.

TECHNICAL FIELD

The present invention relates to an air cleaner and an engine control system. In particular, the present invention relates to an air cleaner and an engine control system that are capable of stabilizing the flow rate of air supplied to an engine.

BACKGROUND ART

For purpose of lowering the combustion temperature of a diesel engine to suppress generation of NOx, so-called EGR (Exhaust Gas Recirculation) systems, which deliver part of exhaust gas discharged from the engine to an intake line, have typically been known.

In particular, in such EGR systems, there has typically been known a system in which a variable geometry turbocharger is disposed at a downstream side of an air cleaner through which outside air is supplied, so that the air supplied through the air cleaner is compressed and supplied to the engine. The respective opening degrees of an EGR valve and a nozzle of the variable geometry turbocharger are electronically controlled by a controller.

The control by the controller is performed based on a flow rate of the air filtered through the air cleaner measured by using a mass flowmeter. Thus, an accuracy of a flow rate value measured by using the mass flowmeter has a large influence on the accuracy of the control by the controller.

CITATION LIST

Patent Literature

Patent Literature 1: JP-A-10-48021

SUMMARY OF THE INVENTION

Problems to be Solved by the Invention

In a large-sized diesel engine utilized in a construction machine or the like, there has typically been known an air cleaner provided with concentric inner cylindrical filter and outer cylindrical filter, and a case for housing these filters in order to improve the effectiveness of the air cleaner in capturing dust in the air.

With this air cleaner, since the supplied outside air is filtered through a double-layered structure of the inner cylindrical filter and the outer cylindrical filter, the cleanliness of the discharged air can be improved.

In the air cleaner, the inner cylindrical filter is generally fixed in the case for housing the filters but the outer cylindrical filter can be replaced depending on the dirtiness of the filter.

The flow of the air inside the case of the air cleaner can be slightly changed depending on the variation of the filter papers of the outer cylindrical filter or the positional relationship between the fixed inner cylindrical filter and the mounted outer cylindrical filter inside the case. Thus, when the technique disclosed in the above Patent Literature 1 is simply applied, the flow rate of the air may not be highly accurately measured by using the mass flowmeter.

An object of the invention is to provide an air cleaner and an engine control system that are capable of a highly-accurate measurement of the flow rate of air discharged from the air cleaner and a significant improvement in the cleanliness of air after filtering.

Means for Solving the Problems

According to an aspect of the invention, an air cleaner that takes outside air and discharges the air after removing dust from the air, the air cleaner includes: an inner cylindrical filter and an outer cylindrical filter being concentrically disposed; and a case in which the inner cylindrical filter and the outer cylindrical filter are housed, the case having a bottomed cylindrical body that defines an opening end surface closed by a cover member, in which the case includes an upstream-side pipe and a downstream-side pipe, the upstream-side pipe being provided to an outer circumference of the bottomed cylindrical body and supplying the outside air into the case, the downstream-side pipe being provided to a substantial center a bottom of the bottomed cylindrical body defined at a downstream side in an air-flowing direction, the downstream-side pipe discharging the air supplied through the upstream-side pipe and filtered through the inner cylindrical filter and the outer cylindrical filter, a mass flowmeter is provided in the downstream-side pipe to measure a flow rate of the air in the downstream-side pipe, and a flow straightening grid is provided at an upstream side of the mass flowmeter to straighten the flow of the air in the downstream-side pipe, the flow straightening grid having an outer diameter larger than an inner diameter of the downstream-side pipe, the flow straightening grid being interposed between the bottom and inner cylindrical filter while being held by a resin material.

The flow straightening grid is made of metal mesh, perforated metal or the like.

In the above aspect, it is preferable that the flow straightening grid have an outer diameter substantially equal to or larger than a pipe diameter of the downstream-side pipe and be mounted between the bottom and the inner cylindrical filter. The flow straightening grid may be welded between the bottom and the inner cylindrical filter.

In the above aspect, it is preferable that the inner cylindrical filter have an inner diameter substantially equal to or larger than an inner diameter of the downstream-side pipe.

In the above aspect, it is preferable that the flow straightening grid be provided by a metal-mesh grid member and have a space ratio in a range from 30% to 50%.

With reference to FIG. 2, the space ratio (%) is obtained by the following equation (1).

$$\text{Space ratio } (\%) = (B^2/A^2) \times 100 \qquad \text{Equation (1)}$$

In the above aspect, it is preferable that the flow straightening grid be formed by weaving wires having a wire diameter equal to or larger than 0.2 mm in a grid pattern.

The wire diameter means the thickness of the wires forming the flow straightening grid.

According to another aspect of the invention, an engine control system includes: an EGR valve inserted in an exhaust gas recirculation path through which part of exhaust gas from an engine is recirculated to an inlet side; the above-described air cleaner; a variable geometry turbocharger being driven by the exhaust gas from the engine, the variable geometry turbocharger taking and compressing the air filtered by the air cleaner and discharging the air to the engine; and a controller that controls the EGR valve and the variable geometry turbocharger, in which the controller includes: a flow rate detecting section that detects a signal from the mass flowmeter provided to the air cleaner; an EGR valve opening degree controlling section that performs an opening degree control for the EGR valve; and a nozzle opening degree controlling section that performs an opening degree control for a nozzle provided in the variable geometry turbocharger, and the EGR valve opening degree controlling section and the nozzle opening degree controlling section respectively perform the opening degree control for the EGR valve and the opening degree control for the nozzle in accordance with the signal detected by the flow rate detecting section.

With the above aspect, since the flow straightening grid is disposed at the upstream side of the mass flowmeter, the flow of the air inside the downstream-side pipe can be straightened and, consequently, the flow rate can be highly accurately measured by using the mass flowmeter. A double-layered structure defined by the inner cylindrical filter and the outer cylindrical filter improves filtering efficiency, thereby improving the cleanliness of the discharged air.

Since the flow straightening grid is mounted between the bottom and the inner cylindrical filter, the air having passed through the inner cylindrical filter is straightened through the flow straightening grid. Thus, even when the flow of the air is changed because of the positional relationship between the inner cylindrical filter and the outer cylindrical filter or the like, the flow of the air is straightened through the flow straightening grid, thereby avoiding a turbulent flow or an uneven flow of the air inside the downstream-side pipe.

The inner diameter of the inner cylindrical filter is substantially equal to or larger than that of the downstream-side pipe. Thus, it is possible to prevent turbulence in the flow of the air from the inner cylindrical filter to the downstream-side pipe as a result of the expansion of the flow, thereby further reliably preventing a turbulent flow or an uneven flow inside the downstream-side pipe.

With the flow straightening grid having a 30% to 50% space ratio or having a wire diameter of 0.2 mm or larger, it is possible to improve the accuracy of a flow rate value measured by the mass flowmeter while preventing the pressure loss of the flow of the air in the air cleaner. When the wire diameter is set at 0.2 mm or larger, it is possible to prevent damage to the flow straightening grid due to deterioration of metal wires forming the flow straightening grid after long-term usage, or breakage or the like of the mesh caused when foreign substances enter.

The flow rate detecting section of the controller detects the detection signal from the mass flowmeter and calculates the flow rate. In accordance with the calculated flow rate, the valve opening degree of the EGR valve disposed in the exhaust gas recirculation path and the nozzle opening degree of the variable geometry turbocharger are controlled. Since the mass flow rate of the straightened air is measured, an accurate EGR control can be performed in accordance with the mass flow rate of the air, thereby favorably controlling the engine.

BRIEF DESCRIPTION OF DRAWINGS

FIG. 9 is a graph showing relationships of the space ratio of the flow straightening grid to error ratio and to pressure loss in Case 4 (10 inches).

DESCRIPTION OF EMBODIMENTS

An exemplary embodiment of the invention will be described below with reference to the attached drawings.

Structure of Air Cleaner 10

Figure 1:
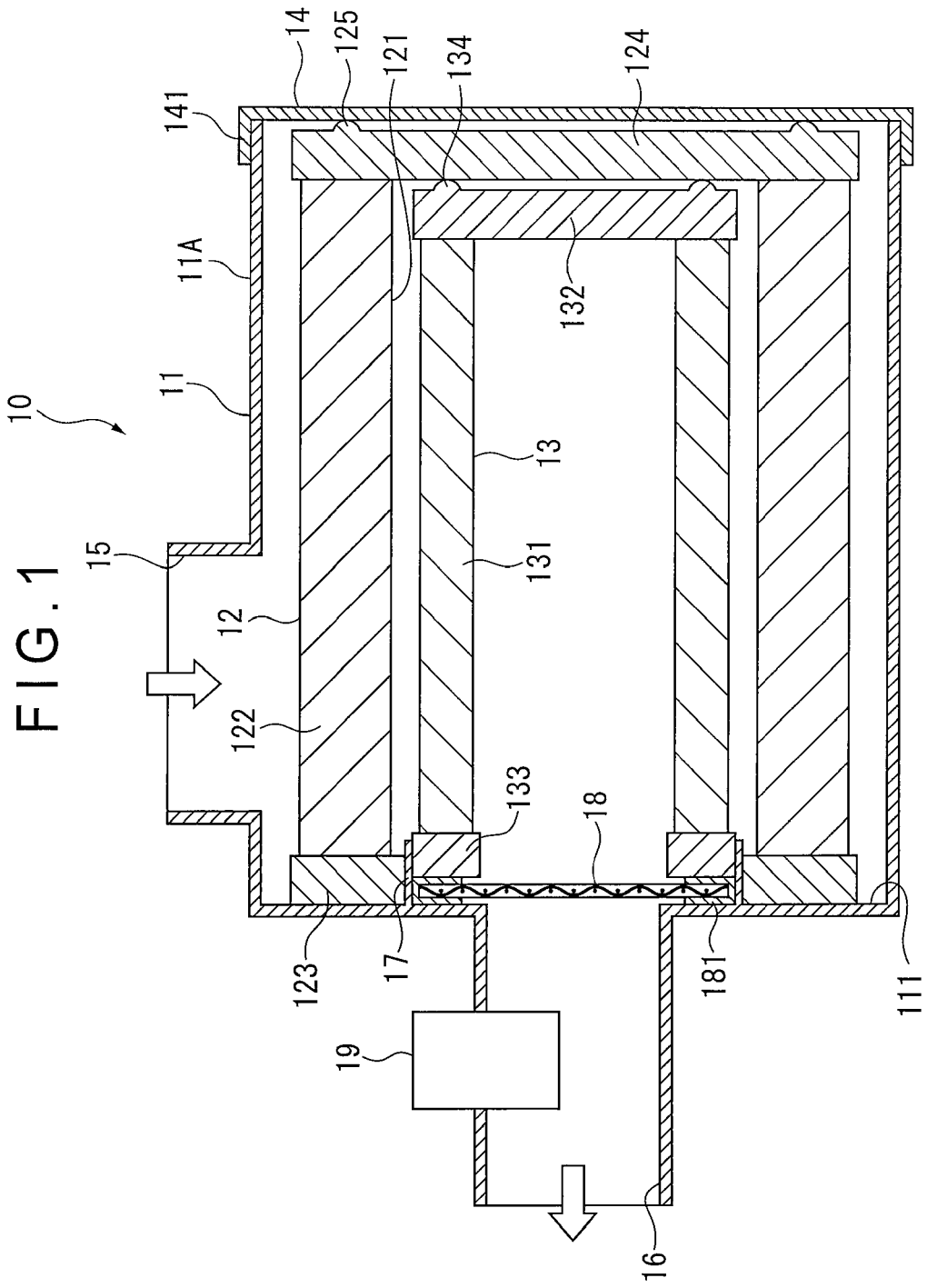
FIG. 1 is a cross sectional view showing an air cleaner according to an exemplary embodiment of the invention.

FIG. 1 is a cross sectional view showing an air cleaner 10 according to this exemplary embodiment.

The air cleaner 10 is an airflow filtering device that takes outside air and discharges the air after removing dust from the air, so that the dust-free air is supplied to an engine or the like. The air cleaner 10 includes a case 11, an outer cylindrical filter 12, an inner cylindrical filter 13 and a flow straightening grid 18. The outer cylindrical filter 12 and the inner cylindrical filter 13 are concentrically disposed inside the case 11.

The case 11 houses the outer cylindrical filter 12 and the inner cylindrical filter 13 through which the air is filtered and includes a case body 11A and a cover member 14 that closes an opening end surface of the case body 11A.

The case body 11A is a bottomed cylindrical body made of synthetic resin or the like. The cover member 14 is a disc-shaped body that covers the opening end surface of the case body 11A. A rib 141 protruding in an out-of-plane direction is formed on an outer periphery of the cover member 14. The rib 141 is engaged with an outer peripheral surface of the case body 11A.

The outer peripheral surface of the case body 11A is provided with an air inlet 15 as an upstream-side pipe through which outside air is supplied into the case 11. The air inlet 15 is disposed eccentrically to the center of the case body 11A. The air is directed to an outer peripheral surface of the outer cylindrical filter 12. The opening end surface of the case body 11A, which defines an opening, is closed by the cover member 14. The substantial center of a bottom 111 of the case body 11A is provided with an exhaust outlet 16 as a downstream-side pipe through which the air filtered through the outer cylindrical filter 12 and the inner cylindrical filter 13 is discharged. With the above arrangement, when the outer cylindrical filter 12 is deteriorated with dust, the cover member 14 is removed so as to replace the outer cylindrical filter 12. An inner surface of the bottom 111 of the case 11 is provided with an annular protrusion 17 that annularly protrudes and has a diameter larger than an inner diameter of the exhaust outlet 16. The inner cylindrical filter 13, which will be described later, is, engaged with the annular protrusion 17.

The outer cylindrical filter 12 includes a cylindrical portion 122 being formed in a cylindrical shape by accordion-folding a general-purpose filter for filtering the air supplied in the case 11, an annular holder 123 made of urethane that holds a first end of the cylindrical portion 122, and a circular holder 124 made of urethane that holds a second end of the cylindrical portion 122.

The annular holder 123 is in contact with the bottom 111 of the case 11 and is removably attached to an outer peripheral surface of the annular protrusion 17. An annular projection 125 is formed on an outer surface of the circular holder 124. The projection 125 is in contact with the cover member 14.

Specifically, when the cover member 14 biases the projection 125 after replacement of the outer cylindrical filter 12, the circular holder 124 made of urethane (elastic body) is shrunk, so that the cover member 14 and the circular holder 124 come into close contact with each other. Moreover, as the projection 125 is biased, the annular holder 123 made of urethane (elastic body) is pressed against the bottom 111, so that the bottom 111 and the annular holder 123 come into close contact with each other. As a result, the air supplied through the air inlet 15 is directed only to an outer peripheral surface of the cylindrical portion 122.

The inner cylindrical filter 13 serves to further filter the air filtered through the outer cylindrical filter 12 and to prevent unfiltered air from flowing into the downstream side at the time of replacement of the outer cylindrical filter 12. The inner cylindrical filter 13 is housed in a hollow space 121 defined by the outer cylindrical filter 12 and includes a cylindrical portion 131 being formed in a cylindrical shape by accordion-folding a general-purpose filter in the same manner as in the outer cylindrical filter 12, a circular holder 132 made of urethane that holds a first end of the cylindrical portion 131, and an annular holder 133 made of urethane that holds a second end of the cylindrical portion 131.

An annular projection 134 is formed on an outer surface of the circular holder 132. The projection 134 is in contact with the circular holder 124 of the outer cylindrical filter 12. The annular holder 133 is fitted and fixed to an inner peripheral surface of the annular protrusion 17.

Inner and outer peripheral surfaces of the outer cylindrical filter 12 and the inner cylindrical filter 13 are covered by plates of metal mesh (not shown). The metal meshes are welded at both ends of the outer cylindrical filter 12 and the inner cylindrical filter 13 to be in a cylindrical shape. The positional relationships of the welded portions to the outer cylindrical filter 12 and the inner cylindrical filter 13 are one of the factors that change the flow of the air inside the case 11.

The flow straightening grid 18 serves to straighten the flow of the filtered air to be discharged out of the case 11 and is formed by weaving stainless-steel wires in a grid pattern. An entire outer periphery of the flow straightening grid 18 is resin-molded. The flow straightening grid 18 is welded to the annular protrusion 17 via a resin material 181.

The circular holder 124 of the outer cylindrical filter 12 biases the projection 134 of the inner cylindrical filter 13, so that the circular holder 124 made of urethane (elastic body) and the circular holder 132 come into close contact with each other. As the projection 134 is biased by the holder 124, the resin material 181 is biased by the annular holder 133, so that the annular holder 133 and the resin material 181 come into close contact with each other, thereby firmly holding the flow straightening grid 18. As a result, the deformation of the flow straightening grid 18 is prevented.

The flow straightening grid 18 selected to be used in this exemplary embodiment has a small value) obtained by dividing a difference between a mass flow rate beforehand measured at the air inlet 15 (actual flow rate) and a mass flow rate measured at the exhaust outlet 16 (measured flow rate) by the actual flow rate (hereinafter referred to as "error ratio"), and a low pressure loss through the flow straightening grid 18. Accordingly, the flow straightening grid 18 according to this exemplary embodiment has the following specification: 30 meshes, a wire diameter of 0.29 (mm), and a space ratio of 43.2(%).

The "mesh" means a unit indicating the number of meshes in a one-inch square. The "space ratio" is calculated by the above equation (1) with reference to FIG. 2. Description will be made on reasons why the flow straightening grid 18 having the above specification is used.

The flow straightening grid 18 may be made of any material other than stainless steel, such as nickel, aluminum or copper, and may be provided by perforated metal instead of metal mesh.

In this exemplary embodiment, the inner diameter of the inner cylindrical filter 13 is substantially equal to or larger than the inner diameter of the exhaust outlet 16. When the air filtered through the outer cylindrical filter 12 and the inner cylindrical filter 13 passes through the inside of the inner cylindrical filter 13 to be discharged to the exhaust outlet 16, since the inner diameter of the inner cylindrical filter 13 is substantially equal to or larger than the inner diameter of the exhaust outlet 16, it is possible to prevent turbulence in the flow of the air from the inner cylindrical filter 13 to the exhaust outlet 16 due to the expansion of the flow, thereby avoiding a turbulent flow or the like. The flow-straightening effect can work on the flow of the air. A mass flow rate sensor 19 as a mass flowmeter for measuring the flow rate of the air passing through the exhaust outlet 16 is attached to the exhaust outlet 16. Upon measurement of the flow rate of the air, the mass flow rate sensor 19 generates a detection signal and outputs the detection signal to a controller 30.

Operation of Air Cleaner 10

When being supplied into the case 11 through the air inlet 15 of the air cleaner 10, outside air is filtered first through the outer cylindrical filter 12 and then through the inner cylindrical filter 13. The flow of the filtered air is straightened through the flow straightening grid 18 and is discharged from the exhaust outlet 16.

Structure of Engine Control System 20

Figure 3:
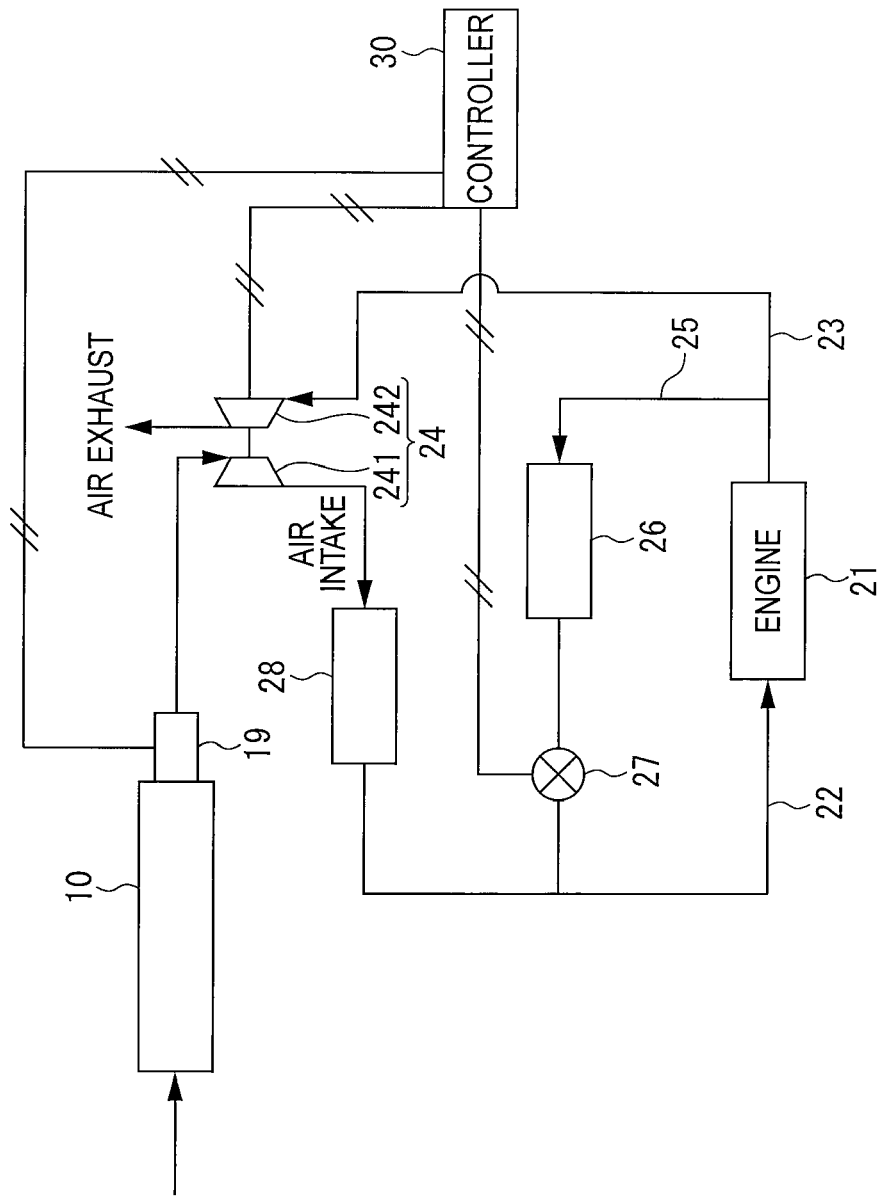
FIG. 3 is a schematic showing an engine control system according to the exemplary embodiment.

FIG. 3 is a schematic illustrating an engine control system 20 according to this exemplary embodiment.

The engine control system 20 includes a diesel engine (hereinafter referred to simply as an engine) 21, a variable geometry turbocharger 24, an EGR line 25 as an exhaust gas recirculation path, an EGR cooler 26 and an EGR valve 27 both inserted in the EGR line 25, the air cleaner 10, the mass flow rate sensor 19 as a mass flowmeter, and the controller 30.

The variable geometry turbocharger 24, being connected to an inlet line 22 and an exhaust line 23, includes a compressor 241 inserted in the inlet line 22 through which air is supplied to the engine 21 and a turbine 242 inserted in the exhaust line 23 through which exhaust gas from the engine 21 is discharged.

The turbine 242 is driven by the exhaust gas from the engine 21. Supplied air is supercharged by the compressor 241, which is rotated along with the rotation of the turbine 242, and is supplied to the engine 21 through an aftercooler 28. The variable geometry turbocharger 24 is provided with an opening degree adjustment mechanism for adjusting an opening degree of a nozzle (not shown). The controller 30 outputs a signal to the opening degree adjustment mechanism to control the opening degree of the nozzle.

The EGR line 25 is the exhaust gas recirculation path branched from the exhaust line 23. The EGR line 25 short-circuits the inlet line 22 and the exhaust line 23, so that part of the exhaust gas from the engine 21 is extracted to be supplied into the inlet line 22 for recirculation of the exhaust gas. The EGR cooler 26 for cooling the exhaust gas to be returned to the inlet side and the EGR valve 27 are inserted in the EGR line 25.

The EGR valve 27 is provided by a solenoid valve configured to open and close in response to the signal outputted from the controller 30 so that the opening degree thereof is controlled.

The mass flow rate sensor 19 is provided by a general-purpose mass airflow sensor (MAF sensor). The mass flow rate sensor 19, which measures the flow rate of the air passing through the exhaust outlet 16 and outputs a detection signal to the controller 30, is attached at the downstream side of the air cleaner 10.

Structure of Controller 30

Figure 4:
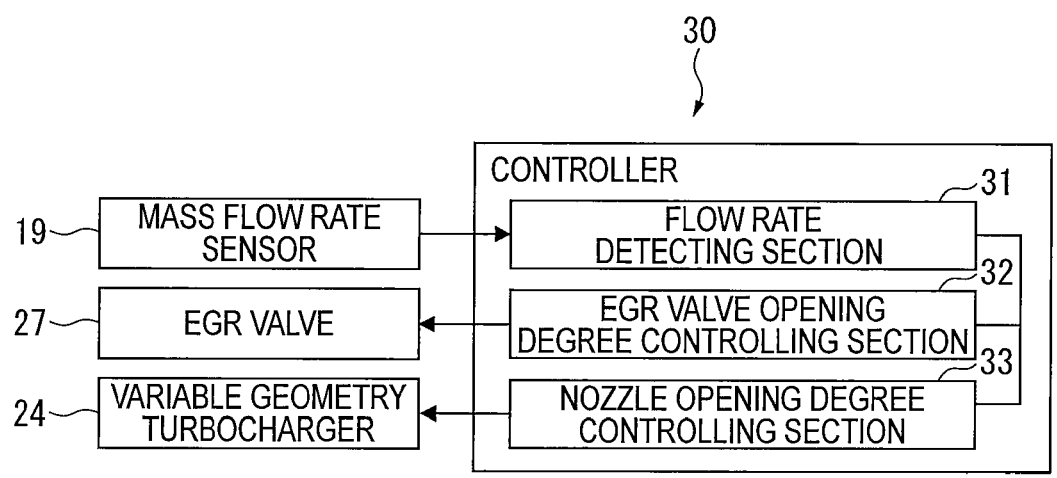
FIG. 4 is a block diagram showing the engine control system.

FIG. 4 is a block diagram of the controller 30 used in the engine control system 20.

As shown in FIG. 3, the controller 30 is electrically connected to each of the opening degree adjustment mechanism of the variable geometry turbocharger 24, the EGR valve 27 and the mass flow rate sensor 19 respectively to control the EGR valve 27 and nozzle (illustration omitted) of the variable geometry turbocharger 24 in accordance with the detection signal outputted from the mass flow rate sensor 19.

The controller 30 includes a flow rate detecting section 31, an EGR valve opening degree controlling section 32 and a nozzle opening degree controlling section 33.

As shown in FIG. 4, upon detecting the detection signal outputted from the mass flow rate sensor 19, the flow rate detecting section 31 calculates a mass flow rate and outputs the mass flow rate to the EGR valve opening degree controlling section 32 and the nozzle opening degree controlling section 33.

The EGR valve opening degree controlling section 32 calculates the opening degree of the EGR valve 27 based on the mass flow rate outputted from the flow rate detecting section 31 and outputs a signal to the EGR valve 27.

The nozzle opening degree controlling section 33 calculates the nozzle opening degree of the variable geometry turbocharger 24 based on the mass flow rate outputted from the flow rate detecting section 31 and outputs a signal to the opening degree adjustment mechanism.

Figure 5:
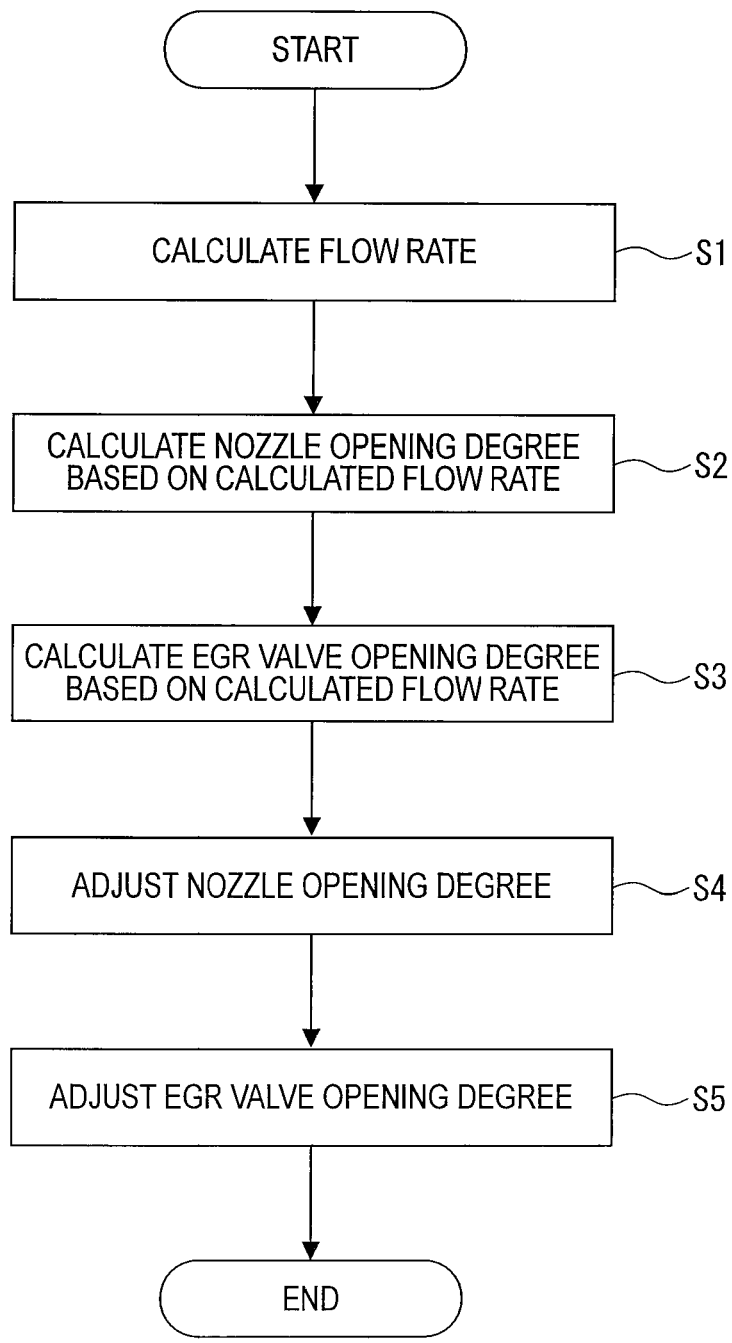
FIG. 5 is a flow chart of the engine control system.

Description will be made with reference to a flow chart of the engine control system 20 shown in FIG. 5.

The mass flow rate sensor 19 measures the flow rate of air passing through the exhaust outlet 16 and outputs the detection signal to the flow rate detecting section 31 of the controller 30. The flow rate detecting section 31 calculates the flow rate based on the detection signal (S1). Upon receipt of the calculated flow rate outputted from the flow rate detecting section 31, the nozzle opening degree controlling section 33 calculates the opening degree of the nozzle of the variable geometry turbocharger 24 based on this flow rate (S2) and outputs the signal to the opening degree adjustment mechanism of the variable geometry turbocharger 24. Likewise, upon receipt of the calculated flow rate outputted from the flow rate detecting section 31, the EGR valve opening degree controlling section 32 calculates the opening degree of the EGR valve 27 based on this flow rate (S3) and outputs the signal to the EGR valve 27. Subsequently, the opening degree adjustment mechanism of the variable geometry turbocharger 24 adjusts the opening degree of the nozzle to the calculated nozzle opening degree (S4). Likewise, the EGR valve 27 adjusts the opening degree of the EGR valve 27 to the calculated opening degree of the EGR valve 27 (S5).

According to this exemplary embodiment, the flow straightening grid 18 having a small error ratio between the mass flow rate of the air measured by the mass flow rate sensor 19 and the mass flow rate of the air beforehand measured at the air inlet 15 and a low pressure loss is selectively used. Thus, irrespective of the positional relationship between the outer cylindrical filter 12 and the inner cylindrical filter 13, or the like, the flow rate of the air discharged from the air cleaner 10 can be highly accurately measured. In the case 11 of the air cleaner 10, the outer cylindrical filter 12 and the inner cylindrical filter 13 are housed to provide the double-layered structure. Thus, dust or the like is reliably removed from the supplied outside air, thereby improving the cleanliness of the air. The engine 21 is controlled based on the flow rate of the air measured with a high accuracy. Thus, the controller 30 can perform a more accurate EGR control.

The specification of the flow straightening grid 18 used in this exemplary embodiment is determined based on the following experimental results. The experiment was conducted as follows for each of Cases 1 to 4 that differ in the size of the air cleaner 10. The sizes of Cases 1 to 4 are respectively 15 inches, 13 inches, 11 inches and 10 inches.

Experiment

A plurality of sample flow straightening grids are individually set in the air cleaner 10 in the same manner as in the above exemplary embodiment. The sample flow straightening grids used for the experiment are listed in Tables 1 to 4. At the time of, for instance, attachment or removal of the outer cylindrical filter 12 for replacement, the attachment position of the outer cylindrical filter 12 can be shifted or the like, so that the flow of the air is changed and, consequently, an error in the flow rate of the air occurs. Accordingly, in this experiment, an error ratio (%) and a pressure loss (kPa) were measured every 45 degree rotation of the outer cylindrical filter 12 to employ the flow straightening grid 18 having the smallest error ratio (%). The results are shown in FIGS. 6 to 9.

Figure 2:
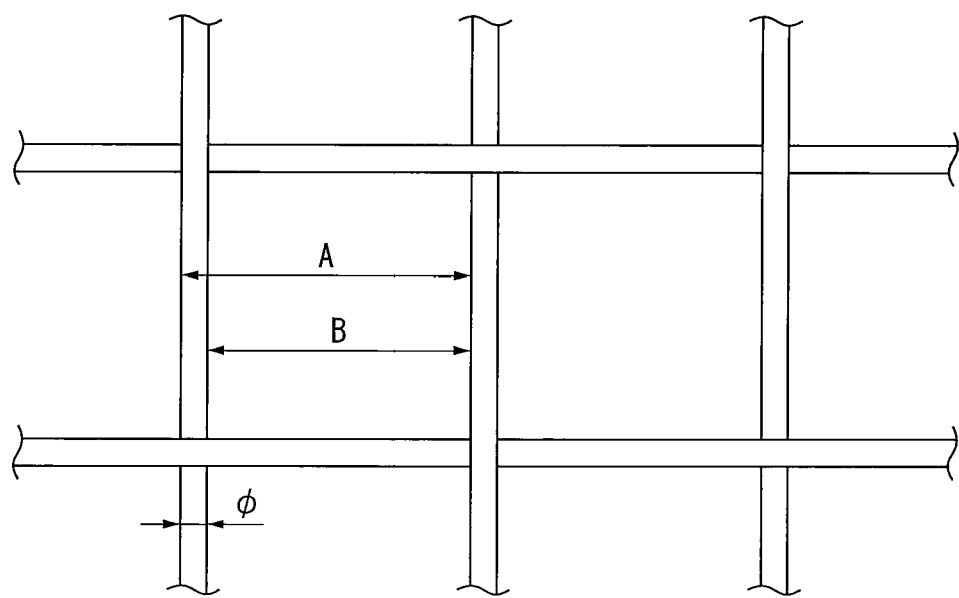
FIG. 2 is an enlarged view showing a flow straightening grid utilized in the air cleaner.

The "clearance (mm)" indicated in Tables 1 to 4 means a dimension between wires B shown in FIG. 2.

TABLE 1

Case 1 (15 inches)

| Wire Diameter Ø [mm] | — | 0.20 | 0.37 | 0.20 | 0.29 | 0.06 | 0.12 |
|---|---|---|---|---|---|---|---|
| Mesh | — | #20 | #20 | #40 | #30 | #150 | #80 |
| Clearance [mm] | — | 1.07 | 0.90 | 0.44 | 0.56 | 0.11 | 0.20 |
| Space Ratio [%] | 100 | 71.0 | 50.2 | 46.9 | 43.2 | 41.7 | 38.7 |

TABLE 2

Case 2 (13 inches)

| Wire Diameter Ø [mm] | — | 0.20 | 0.20 | 0.37 | 0.20 | 0.29 | 0.12 |
|---|---|---|---|---|---|---|---|
| Mesh | — | #20 | #30 | #20 | #40 | #30 | #80 |
| Clearance [mm] | — | 1.07 | 0.65 | 0.90 | 0.44 | 0.56 | 0.20 |
| Space Ratio [%] | 100 | 71.0 | 58.3 | 50.2 | 46.9 | 43.2 | 38.7 |

TABLE 3

Case 3 (11 inches)

| Wire Diameter Ø [mm] | — | 0.37 | 0.29 | 0.12 |
|---|---|---|---|---|
| Mesh | — | #20 | #30 | #80 |
| Clearance [mm] | — | 0.90 | 0.56 | 0.20 |
| Space Ratio [%] | 100 | 50.2 | 43.2 | 38.7 |

TABLE 4

| | Case 4 (10 inches) | | | | |
| --- | --- | --- | --- | --- | --- |
| Wire Diameter Ø [mm] | — | 0.37 | 0.29 | 0.06 | 0.12 |
| Mesh | — | #20 | #30 | #150 | #80 |
| Clearance [mm] | — | 0.90 | 0.56 | 0.11 | 0.20 |
| Space Ratio [%] | 100 | 50.2 | 43.2 | 41.7 | 38.7 |

With reference to the graphs of the measurement results shown in FIGS. 6 to 9, the following is to be understood.
1. It is understood that the pressure loss (kPa) has a tendency to become larger as the space ratio (%) becomes lower, and this tendency is enhanced when the space ratio is lower than 40% and the pressure loss becomes too large to supply a sufficient amount of air to the inlet line 22 when the space ratio falls below 30%.
2. It is revealed that while the error ratio has a tendency to become higher as the space ratio becomes higher as a whole, the error ratio is reduced to the lowest value when the space ratio is in a range from 40% to 50%.
3. For allowing the air cleaner 10 to be sufficiently effective, it is preferable to employ a flow straightening grid having a space ratio equal to or higher than 30%, at which the pressure loss is prevented from being too large, but not exceeding 50%, at which the error ratio can be the lowest.

Next, description will be made on the respective results shown in FIGS. 6 to 9 with reference to Tables 1 to 4.

Figure 6:
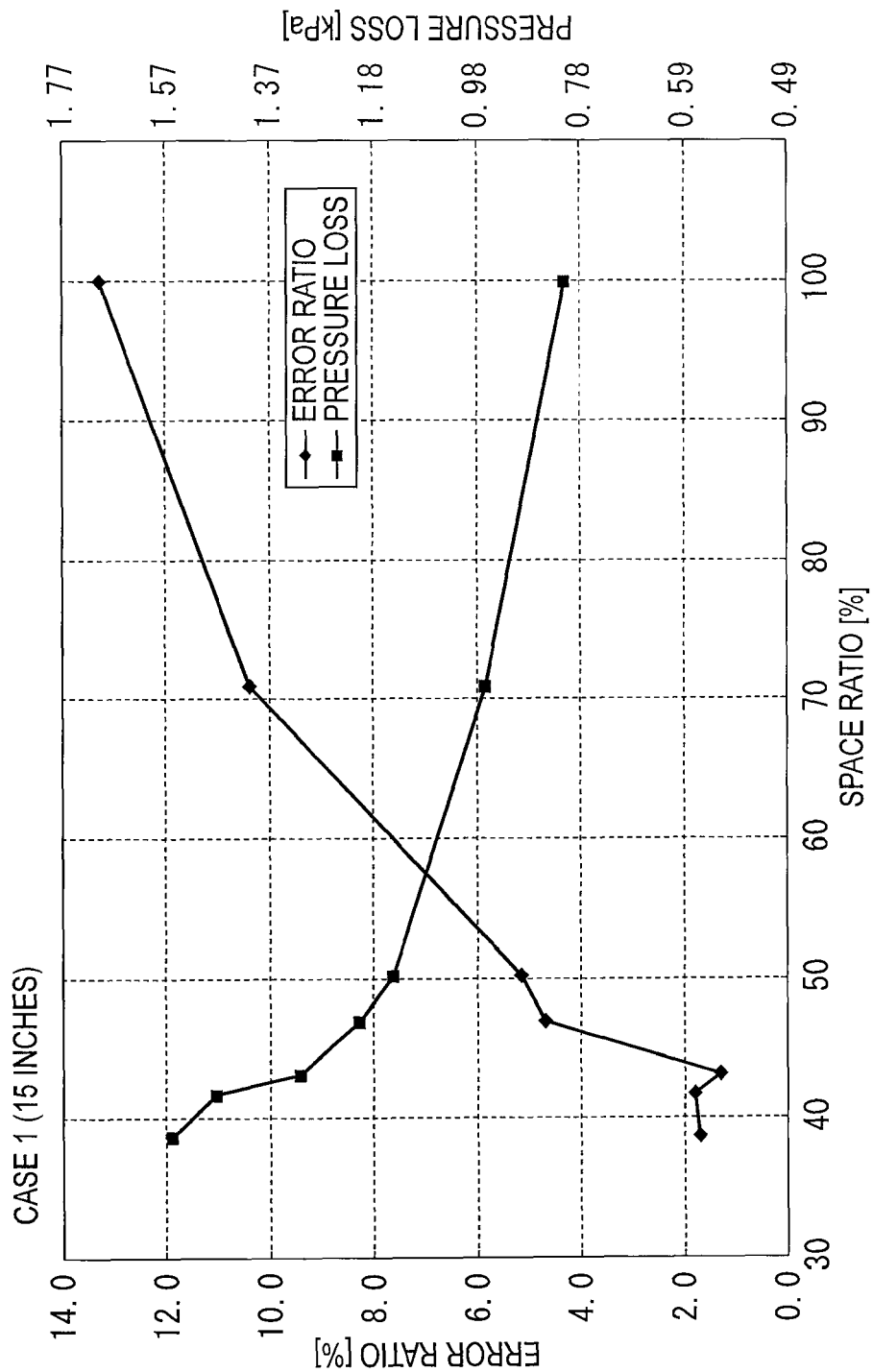
FIG. 6 is a graph showing relationships of the space ratio of the flow straightening grid to error ratio and to pressure loss in Case 1 (15 inches).

With reference to the graph of Case 1 (15 inches) shown in FIG. 6, one having the lowest error ratio and the third lowest space ratio among the samples is optimal. Specifically, with reference to Table 1, a flow straightening grid having a wire diameter of 0.29 (mm) and 30 meshes is optimal.

Figure 7:
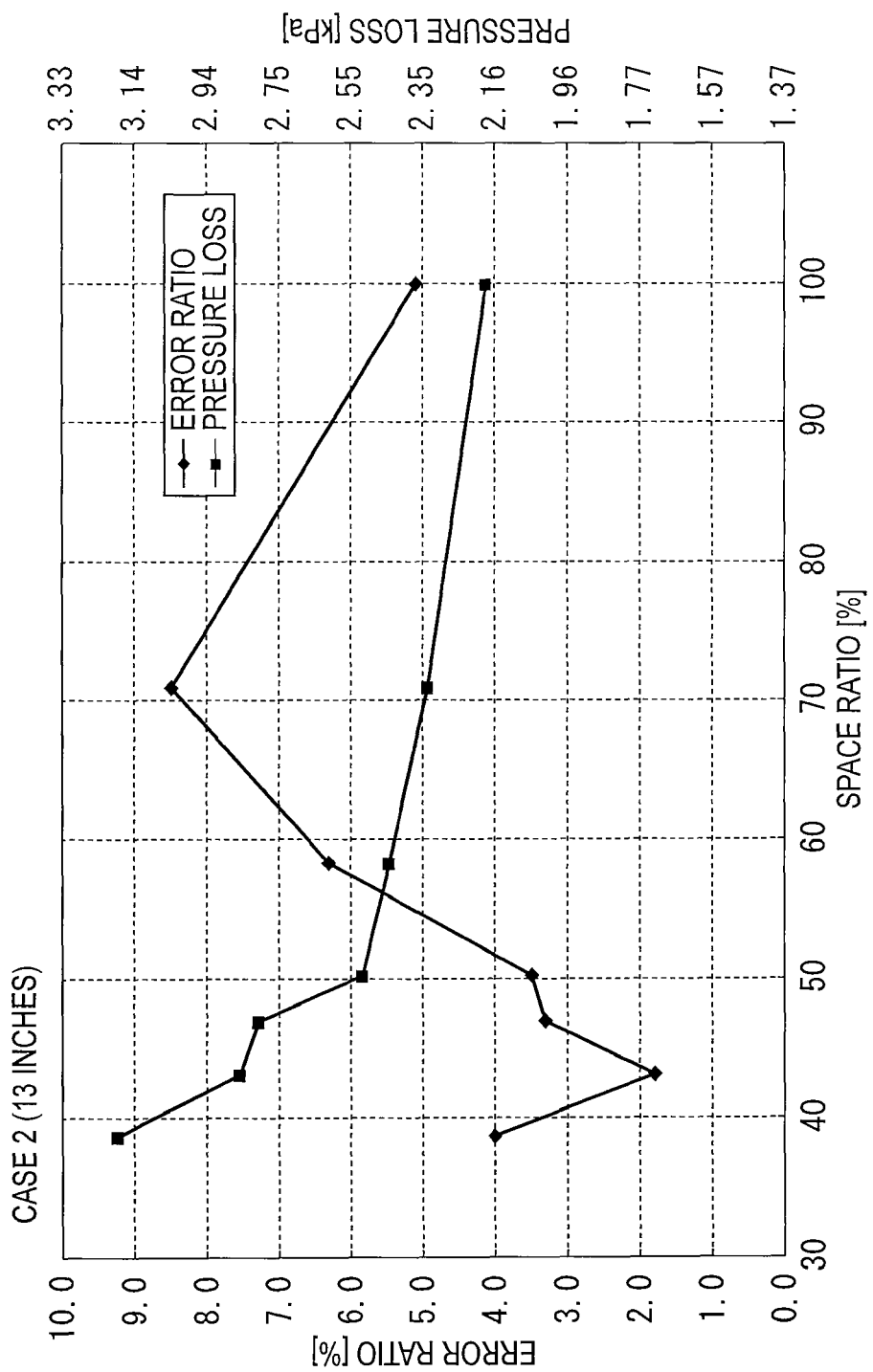
FIG. 7 is a graph showing relationships of the space ratio of the flow straightening grid to error ratio and to pressure loss in Case 2 (13 inches).

With reference to the graph of Case 2 (13 inches) shown in FIG. 7, one having the lowest error ratio and the second lowest space ratio among the samples is optimal. Specifically, with reference to Table 2, a flow straightening grid having a wire diameter of 0.29 (mm) and 30 meshes is optimal.

Figure 8:
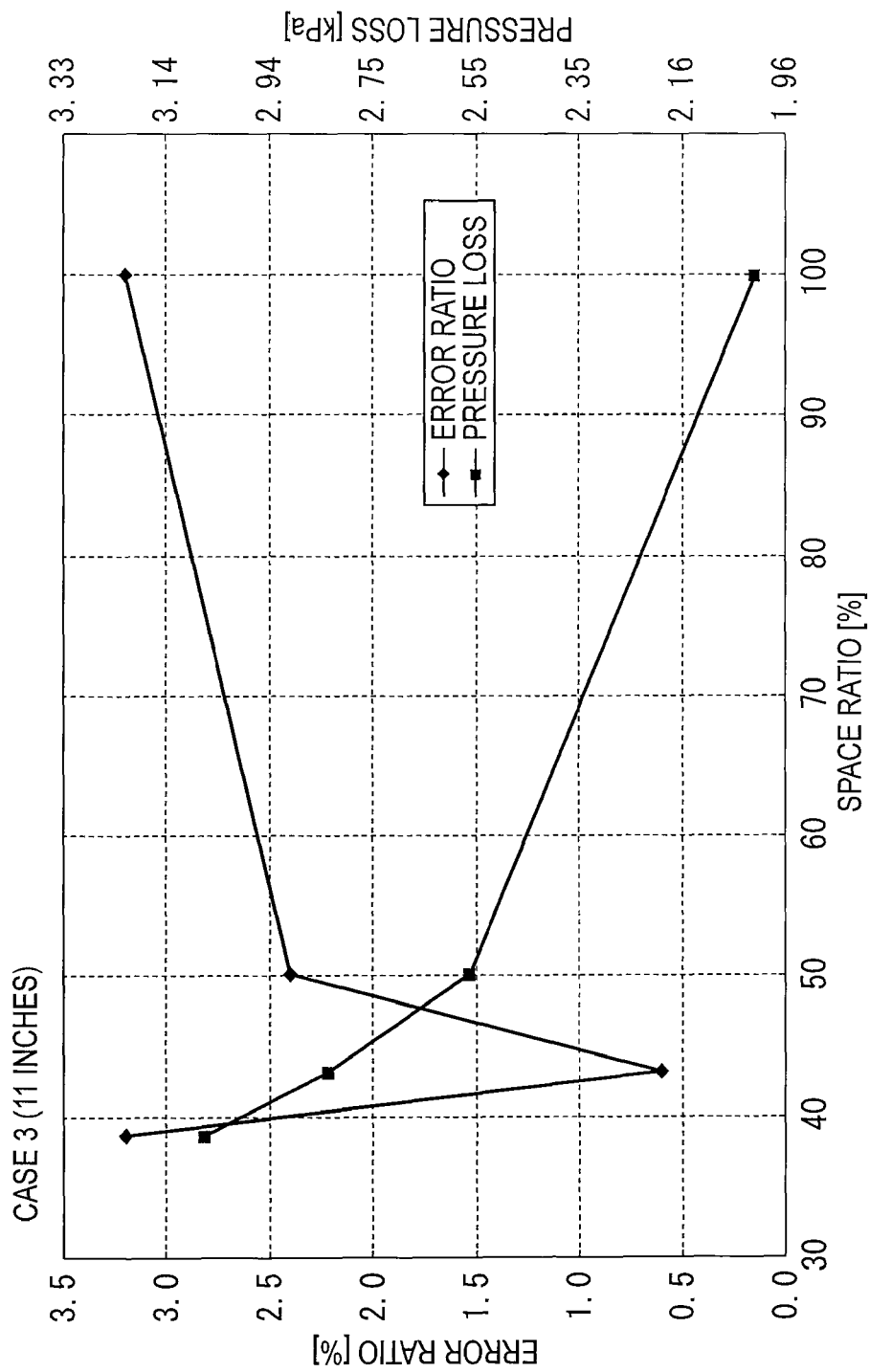
FIG. 8 is a graph showing relationships of the space ratio of the flow straightening grid to error ratio and to pressure loss in Case 3 (11 inches).

With reference to the graph of Case 3 (11 inches) shown in FIG. 8, one having the lowest error ratio and the second lowest space ratio among the samples is optimal. Specifically, with reference to Table 3, a flow straightening grid having a wire diameter of 0.29 (mm) and 30 meshes is optimal.

With reference to the graph of Case 4 (10 inches) shown in FIG. 9, one having the lowest error ratio and the third lowest space ratio among the samples is optimal. Specifically, with reference to Table 4, a flow straightening grid having a wire diameter of 0.29 (mm) and 30 meshes is optimal.

In view of the above results, for reducing the pressure loss (kPa) to a certain extent while the error ratio is equal to or lower than two (%) and the space ratio is in a range from 30(%) to 50(%), a flow straightening grid having a wire diameter of 0.29 (mm) and 30 meshes is optimal irrespective of the size of an air cleaner. Incidentally, the space ratio is 43.2(%).

Although the best arrangement, method, and the like for carrying out the invention have been described above, the scope of the invention is not limited thereto. In other words, although a particular embodiment of the invention is mainly illustrated and described, a variety of modifications may be made by those skilled in the art on shapes, amounts, and other detailed arrangements of the embodiment as described above without departing from the sprit and object of the invention.

Accordingly, the above description limiting shapes, amounts, and the like is exemplary description for facilitating understanding of the invention and does not limit the scope of the invention, so that description with names of members without all of or a part of the limitations on shapes or amounts are included in the scope of the invention.

In the above exemplary embodiment, while no treatment device is provided to the exhaust line 23, an exhaust gas treatment device such as a DPF (Diesel Particulate Filter) may be provided at the downstream side of the variable geometry turbocharger 24.

The air cleaner and the engine control system according to the invention are favorably applicable to a construction machine, an earth-moving machine, an agricultural machine, a power generator, a transport vehicle or the like.

10 . . . air cleaner, 11 . . . case, 11A . . . case body (bottomed cylindrical body), 12 . . . outer cylindrical filter, 13 . . . inner cylindrical filter, 14 . . . cover member, 15 . . . air inlet (upstream-side pipe), 16 . . . exhaust outlet (downstream-side pipe), 18 . . . flow straightening grid, 19 . . . mass flow rate sensor (mass flowmeter), 20 . . . engine control system, 21 . . . engine, 24 . . . variable geometry turbocharger, 25 . . . EGR line (exhaust gas recirculation path), 27 . . . EGR valve, 30 . . . controller, 31 . . . flow rate detecting section, 32 . . . EGR valve opening degree controlling section, 33 . . . nozzle opening degree controlling section, 111 . . . bottom

The invention claimed is:

1. An air cleaner that removes dust from and discharges air, the air cleaner comprising:
    an inner cylindrical filter and an outer cylindrical filter being concentrically disposed; and
    a case in which the inner cylindrical filter and the outer cylindrical filter are housed, the case including a bottomed cylindrical body having a bottom and defining an opening end surface closed by a cover member, wherein:
    the outer cylindrical filter includes a first cylindrical portion configured to filter the air, a top end of the first cylindrical portion near the cover member being held by a first holder,
    a first projection is provided on an outer side of the first holder, the first projection protruding toward the cover member and configured to be pressed by the cover member,
    the inner cylindrical filter includes a second cylindrical portion configured to filter the air filtered by the outer cylindrical filter, a top end of the second cylindrical portion near the first holder being held by a second holder, and a bottom end of the second cylindrical portion opposite the top end being held by a third holder,
    the third holder is fixed to an inner peripheral surface of an annular protrusion,
    a second projection is provided on an outer side of the second holder, the second projection protruding toward the first holder of the outer cylindrical filter and configured to be pressed by the first holder,
    the case includes an upstream-side pipe and a downstream-side pipe, the upstream-side pipe being provided to an outer circumference of the bottomed cylindrical body and configured to supply the air into the case, the downstream-side pipe being provided to a substantial center of the bottom of the bottomed cylindrical body and configured to discharge the air supplied through the upstream-side pipe and filtered through the inner cylindrical filter and the outer cylindrical filter,
    a mass flowmeter is provided in the downstream-side pipe to measure a flow rate of the air in the downstream-side pipe, and
    a flow straightening grid is provided at an upstream side of the mass flowmeter to straighten the flow of the air in the downstream-side pipe, the flow straightening grid having an outer diameter larger than an inner diameter of the downstream-side pipe, the flow straightening grid being held between opposing surfaces of the bottom of the bottomed cylindrical body and the third holder and disposed against the inner peripheral surface of the annular protrusion.

2. The air cleaner according to claim 1, wherein the inner cylindrical filter has an inner diameter substantially equal to or larger than an inner diameter of the downstream-side pipe.

3. The air cleaner according to claim 1, wherein the flow straightening grid is provided by a metal-mesh grid member and has a space ratio in a range from 30% to 50%.

4. The air cleaner according to claim 3, wherein the flow straightening grid is formed by weaving wires having a wire diameter equal to or larger than 0.2 mm in a grid pattern.

5. An engine control system comprising:
an EGR valve inserted in an exhaust gas recirculation path through which part of exhaust gas from an engine is recirculated to an inlet side;
an air cleaner that removes dust from and discharges air;
a variable geometry turbocharger being driven by the exhaust gas from the engine, the variable geometry turbocharger taking and compressing the air filtered by the air cleaner and discharging the air to the engine; and a controller that controls the EGR valve and the variable geometry turbocharger, wherein
the air cleaner comprises: an inner cylindrical filter and an outer cylindrical filter being concentrically disposed; and
a case in which the inner cylindrical filter and the outer cylindrical filter are housed, the case including a bottomed cylindrical body having a bottom and defining an opening end surface closed by a cover member, wherein;
the outer cylindrical filter includes a first cylindrical portion configured to filter the air, a top end of the first cylindrical portion near the cover member being held by a first holder,
a first projection is provided on an outer side of the first holder, the first projection protruding toward the cover member and configured to be pressed by the cover member,
the inner cylindrical filter includes a second cylindrical portion configured to filter the air filtered by the outer cylindrical filter, a top end of the second cylindrical portion near the first holder being held by a second holder, and a bottom end of the second cylindrical portion opposite the top end being held by a third holder,
the third holder is fixed to an inner peripheral surface of an annular protrusion;
a second projection is provided on an outer side of the second holder, the second projection protruding toward the first holder of the outer cylindrical filter and configured to be pressed by the first holder,
the case includes an upstream-side pipe and a downstream-side pipe, the upstream-side pipe being provided to an outer circumference of the bottomed cylindrical body and configured to supply the air into the case, the downstream-side pipe being provided to a substantial center of the bottom of the bottomed cylindrical body and configured to discharge the air supplied through the upstream-side pipe and filtered through the inner cylindrical filter and the outer cylindrical filter,
a mass flowmeter is provided in the downstream-side pipe to measure a flow rate of the air in the downstream-side pipe,
a flow straightening grid is provided at an upstream side of the mass flowmeter to straighten the flow of the air in the downstream-side pipe, the flow straightening grid having an outer diameter larger than an inner diameter of the downstream-side pipe, the flow straightening grid being held between opposing surfaces of the bottom of the bottomed cylindrical body and the third holder and disposed against the inner peripheral surface of the annular protrusion,
the controller includes: a flow rate detecting section that detects a signal from the mass flowmeter provided at the discharge of the air cleaner; an EGR valve opening degree controlling section that performs an opening degree control for the EGR valve; and a nozzle opening degree controlling section that performs an opening degree control for a nozzle provided in the variable geometry turbocharger, and
the EGR valve opening degree controlling section and the nozzle opening degree controlling section respectively perform the opening degree control for the EGR valve and the opening degree control for the nozzle in accordance with the signal detected by the flow rate detecting section.

6. The air cleaner according to claim 1, wherein at least one of the first and second holders are made of an elastic body.

7. The air cleaner according to claim 1, wherein the first projection of the first holder is configured to be in direct contact with the cover member.

8. The air cleaner according to claim 1, wherein the second projection of the second holder is configured to be in direct contact with the first holder.

9. The air cleaner according to claim 1, wherein the flow straightening grid is held via a resin material interposed between the bottom of the bottomed cylindrical body and the third holder.

* * * * *